(12) United States Patent
Tomomizu et al.

(10) Patent No.: US 8,526,857 B2
(45) Date of Patent: Sep. 3, 2013

(54) CHARGING MEMBER, PROCESS FOR ITS PRODUCTION, PROCESS CARTRIDGE AND ELECTROPHOTOGRAPHIC APPARATUS

(75) Inventors: Yuya Tomomizu, Suntou-gun (JP);
Noriaki Kuroda, Suntou-gun (JP);
Masataka Kodama, Mishima (JP);
Noriko Suzumura, Mishima (JP);
Hiroki Masu, Numazu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/568,913

(22) Filed: Aug. 7, 2012

(65) Prior Publication Data

US 2012/0301180 A1    Nov. 29, 2012

Related U.S. Application Data

(63) Continuation of application No. PCT/JP2012/053896, filed on Feb. 13, 2012.

(30) Foreign Application Priority Data

Feb. 15, 2011 (JP) ................................ 2011-029779

(51) Int. Cl.
*G03G 15/02* (2006.01)
(52) U.S. Cl.
USPC ........................................................ 399/176
(58) Field of Classification Search
USPC ................. 399/168, 174, 176; 428/446, 447, 428/451
See application file for complete search history.

(56) References Cited

U.S. PATENT DOCUMENTS

| | | | |
|---|---|---|---|
| 5,751,801 A * | 5/1998 | Murata et al. | 399/176 |
| 7,144,525 B2 * | 12/2006 | Yoshikawa et al. | 252/500 |
| 7,664,434 B2 | 2/2010 | Kuroda et al. | |
| 7,693,457 B2 | 4/2010 | Kuruma et al. | |
| 7,962,068 B2 | 6/2011 | Kuroda et al. | |

(Continued)

FOREIGN PATENT DOCUMENTS

| | | |
|---|---|---|
| JP | 2002-80785 A | 3/2002 |
| JP | 2007-4102 A | 1/2007 |

(Continued)

OTHER PUBLICATIONS

Suzumura, et al., U.S. Appl. No. 13/615,369, filed Sep. 13, 2012.

(Continued)

*Primary Examiner* — Hoang Ngo
(74) *Attorney, Agent, or Firm* — Fitzpatrick, Cella, Harper & Scinto

(57) ABSTRACT

Provided a charging member which can prevent any contaminants deposited on a cleaning member from adhering thereto by making low a surface free energy and coefficient of friction thereof. The charging member has a substrate, an elastic layer and a surface layer, and the surface layer contains a polymer having an Si—O—W linkage; the polymer having a constitutional unit represented by the following formula (1) and a constitutional unit represented by the following formula (2):

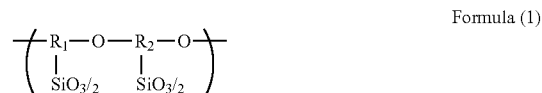

Formula (1)

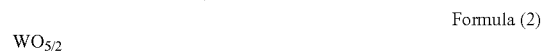

Formula (2)

9 Claims, 3 Drawing Sheets

(56) References Cited

U.S. PATENT DOCUMENTS

| | | |
|---|---|---|
| 8,064,803 B2 | 11/2011 | Kuroda et al. |
| 8,092,358 B2 | 1/2012 | Kuruma et al. |
| 8,227,087 B2 | 7/2012 | Mayuzumi et al. |
| 8,277,947 B2 | 10/2012 | Mayuzumi et al. |
| 2011/0182618 A1 | 7/2011 | Kuruma et al. |
| 2011/0217072 A1 | 9/2011 | Kuroda et al. |
| 2012/0076535 A1 | 3/2012 | Nagamine et al. |
| 2012/0082481 A1 | 4/2012 | Nagamine et al. |
| 2012/0093539 A1 | 4/2012 | Nagamine et al. |
| 2012/0107565 A1 | 5/2012 | Kuroda et al. |
| 2012/0121296 A1 | 5/2012 | Kuroda et al. |
| 2012/0134709 A1 | 5/2012 | Kuroda et al. |
| 2012/0141159 A1 | 6/2012 | Nagamine et al. |
| 2012/0141160 A1 | 6/2012 | Tomomizu et al. |
| 2012/0141162 A1 | 6/2012 | Mayuzumi et al. |
| 2012/0288301 A1 | 11/2012 | Taniguchi et al. |

FOREIGN PATENT DOCUMENTS

| | | |
|---|---|---|
| JP | 2009-288676 A | 12/2009 |
| WO | 2012/023241 A1 | 2/2012 |
| WO | 2012/023270 A1 | 2/2012 |

OTHER PUBLICATIONS

Kodama, et al., U.S. Appl. No. 13/615,403, filed Sep. 13, 2012.
Masu, et al., U.S. Appl. No. 13/649,928, filed Oct. 11, 2012.
Kuroda, et al., U.S. Appl. No. 13/615,380, filed Sep. 13, 2012.
PCT International Search Report and Written Opinion of the International Searching Authority, International Application No. PCT/JP2012/053896, Mailing Date Mar. 19, 2012.

\* cited by examiner

CHARGING MEMBER, PROCESS FOR ITS PRODUCTION, PROCESS CARTRIDGE AND ELECTROPHOTOGRAPHIC APPARATUS

This application is a continuation of International Application No. PCT/JP2012/053896, filed Feb. 13, 2012, which claims the benefit of Japanese Patent Application No. 2011-029779, filed Feb. 15, 2011.

BACKGROUND OF THE INVENTION

1. Field of the Invention

This invention relates to a charging member used in contact charging of electrophotographic apparatus, and a process for producing the same, and to a process cartridge and an electrophotographic apparatus.

2. Description of the Related Art

At present, a contact charging method has been put into practical use as one of methods for charging the surface of an electrophotographic photosensitive member electro-statically. The contact charging method is a method in which a voltage is applied to a charging member disposed in contact with the electrophotographic photosensitive member, to cause micro-discharge at the part of contact between the charging member and the electrophotographic photosensitive member and the vicinity thereof to charge the surface of the electrophotographic photosensitive member electrostatically.

In the contact charging method, in order to improve charging efficiency and uniform charging performance to the electrophotographic photosensitive member, it is necessary to sufficiently and uniformly secure a contact nip between the electrophotographic photosensitive member and the charging member. For such requirement, a charging member has conventionally been proposed which has a substrate and a conductive elastic layer provided on the substrate. Such a conductive elastic layer, however, often contains low-molecular weight components in a relatively large quantity, and hence such low-molecular weight components may bleed out to contaminate the electrophotographic photosensitive member and charging member. Accordingly, in order to keep the low-molecular weight components from bleeding out, a surface layer is provided on the conductive elastic layer in some cases.

A toner, an external additive, discharge products and paper dust which have deposited on a cleaning member for the electrophotographic photosensitive member may also slip through there to contaminate the charging member standing in contact with the electrophotographic photosensitive member. As the result, non-uniform charging comes about to cause lengthwise streaky images.

Japanese Patent Application Laid-open No. 2002-080785 discloses that a conductive filler is made to disperse in an organic-inorganic hybrid film formed by a sol-gel process and this makes the film have a larger contact angle to water to improve its release properties to the toner.

SUMMARY OF THE INVENTION

In recent years, electrophotographic apparatus are sought to be more high-speed and more long-lifetime, and there is a tendency for the toner, external additive, discharge products and paper dust to become larger in their quantity on the charging member. Hence, the charging member shows a tendency to cause the non-uniform charging to cause lengthwise streaky images. As a way of keeping any contaminants from adhering to the charging member, it is effective to make the charging member have a low surface free energy and a low coefficient of friction. This is because the surface free energy affects the affinity for any deposits on surface and affects the coefficient of friction of, and the slipperiness to deposits on, the surface, thus the lowering thereof can prevent any contaminants from adhering to the surface.

Accordingly, the present invention is directed to providing a charging member which can prevent the contaminants coming deposited on a cleaning member from adhering thereto by making low the surface free energy and coefficient of friction of the charging member, and directed to providing a process for producing the charging member.

Further, the present invention is directed to providing a process cartridge and an electrophotographic apparatus which contribute to the formation of high-grade electrophotographic images.

According to one aspect of the present invention, there is provided a charging member comprising a substrate, an elastic layer and a surface layer, which surface layer contains a polymer having an Si—O—W linkage and having a constitutional unit represented by the following formula (1) and a constitutional unit represented by the following formula (2).

Formula (1)

Formula (2)

In the formula (1), $R_1$ and $R_2$ each independently represent any of structures represented by the following formulas (3) to (6).

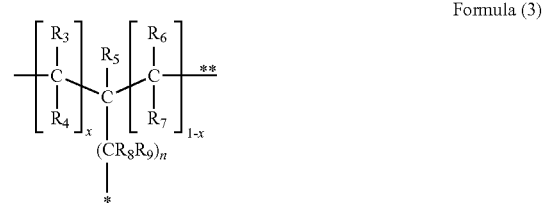

Formula (3)

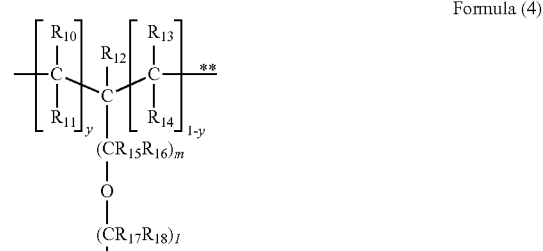

Formula (4)

Formula (5)

-continued

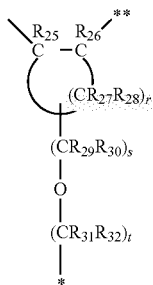

Formula (6)

In the formulas (3) to (6), $R_3$ to $R_7$, $R_{10}$ to $R_{14}$, $R_{19}$, $R_{20}$, $R_{25}$ and $R_{26}$ each independently represent a hydrogen atom, an alkyl group having 1 to 4 carbon atom(s), a hydroxyl group, a carboxyl group or an amino group; $R_8$, $R_9$, $R_{15}$ to $R_{18}$, $R_{23}$, $R_{24}$ and $R_{29}$ to $R_{32}$ each independently represent a hydrogen atom or an alkyl group having 1 to 4 carbon atom(s); $R_{21}$, $R_{22}$, $R_{27}$ and $R_{28}$ each independently represent a hydrogen atom, an alkoxyl group or alkyl group having 1 to 4 carbon atom(s); n, m, l, q, s and t each independently represent an integer of 1 to 8, p and r each independently represent an integer of 4 to 12, and x and y each independently represent 0 or 1; and an asterisk * and a double asterisk ** each represent the position of bonding with the silicon atom and oxygen atom, respectively, in the formula (1).

According to another aspect of the present invention, there is provided a process for producing the above charging member comprising the steps of:

forming on the peripheral surface of the elastic layer a coating film of a coating material containing a hydrolyzed condensate synthesized from hydrolyzable compounds represented by the formulas (11) and (12) shown later; and cleaving epoxy groups of the hydrolyzed condensate to effect cross-linking of the hydrolyzed condensate to form the surface layer.

According to further aspect of the present invention, there is provided a process for producing the above charging member comprising the steps of; forming on the peripheral surface of the elastic layer a coating film of a coating material containing a hydrolyzed condensate synthesized from hydrolyzable compounds represented by the formulas (11), (12) and (17) shown later, and cleaving epoxy groups of the hydrolyzed condensate to effect cross-linking of the hydrolyzed condensate to form the surface layer.

According to still further aspect of the present invention, there is provided an electrophotographic apparatus which has an electrophotographic photosensitive member and the above charging member, disposed in contact with the electrophotographic photosensitive member.

According to the present invention, a process cartridge is still further provided which has an electrophotographic photosensitive member and the above charging member, disposed in contact with the electrophotographic photosensitive member, and which is so set up as to be detachably mountable to the main body of an electrophotographic apparatus.

According to the present invention, a charging member can be obtained to the surface of which any toner, an external additive used in the toner, discharge products, paper dust and so forth can not easily adhere. According to the present invention, a process cartridge and an electrophotographic apparatus can also be obtained that can form high-grade electrophotographic images stably.

Further features of the present invention will become apparent from the following description of exemplary embodiments with reference to the attached drawings.

DESCRIPTION OF THE EMBODIMENTS

Figure 1:
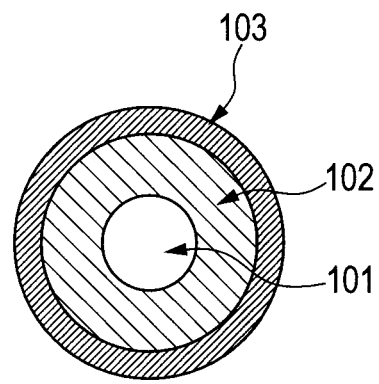
FIG. 1 is a sectional view of the charging member according to the present invention.

The charging member according to the present invention has a substrate, a conductive elastic layer formed on the substrate and a surface layer formed on the conductive elastic layer. The simplest construction of the charging member is the construction that the two layers, the conductive elastic layer and the surface layer, are provided on the substrate. One or two or more different layer(s) may also be provided between the substrate and the conductive elastic layer and/or between the conductive elastic layer and the surface layer. In FIG. 1 showing a cross section of a roller-shaped charging member, which is a typical example of the charging member, reference numeral 101 denotes the substrate; 102, the conductive elastic layer; and 103, the surface layer.

Substrate:

As the substrate of the charging member, it may at least have conductivity (a conductive substrate). For example, a substrate made of a metal (or made of an alloy) such as iron, copper, stainless steel, aluminum, an aluminum alloy or nickel may be used. For the purpose of providing scratch resistance, surface treatment such as plating may also be applied to the surface of any of these substrates as long as its conductivity is not damaged.

Conductive Elastic Layer:

In the conductive elastic layer, one or two or more of elastic materials such as rubbers or thermoplastic elastomers may be used which are used in elastic layers (conductive elastic layers) of conventional charging members.

The rubbers may include the following: Urethane rubbers, silicone rubbers, butadiene rubbers, isoprene rubbers, chloroprene rubbers, styrene-butadiene rubbers, ethylene-propylene rubbers, polynorbornene rubbers, styrene-butadiene-styrene rubbers, acrylonitrile rubbers, epichlorohydrin rubbers and alkyl ether rubbers.

The thermoplastic elastomer may include, e.g., styrene type elastomers and olefin type elastomers. Commercially available products of the styrene type elastomers may include, e.g., RABARON, trade name, available from Mitsubishi Chemical Corporation, and SEPTON COMPOUND, trade name, available from Kuraray Co., Ltd. Commercially available products of the olefin type elastomers may include, e.g., THERMOLAN, trade name, available from Mitsubishi Chemical Corporation, MILASTOMER, trade name, available from Mitsui Petrochemical Industries, Ltd., SUMITOMO TPE, trade name, available from Sumitomo Chemical Co., Ltd., and SANTOPRENE, trade name, available from Advanced Elastomer Systems, L.P.

A conducting agent may also appropriately be used in the conductive elastic layer. This enables control of its conductivity at a stated value. The electrical resistance value of the conductive elastic layer may be controlled by appropriately selecting the type and amount of the conducting agent to be used. The conductive elastic layer may have an electrical resistance value of from $10^2\Omega$ or more to $10^8\Omega$ or less as a preferable range, and from $10^3\Omega$ or more to $10^6\Omega$ or less as a much preferable range.

The conducting agent used in the conductive elastic layer may include, e.g., cationic surface-active agents, anionic surface-active agents, amphoteric surface-active agents, antistatic agents and electrolytes.

The cationic surface-active agents may include the following: Salts of quaternary ammoniums such as lauryl trimethylammonium, stearyl trimethylammonium, octadodecyl trimethylammonium, dodecyl trimethylammonium, hexadecyl trimethylammonium, and modified fatty acid dimethyl ethylammonium; perchlorates, chlorates, tetrafluoroborates, ethosulfates, and benzyl halides such as benzyl bromide and benzyl chloride.

The anionic surface-active agents may include aliphatic sulfonates, higher alcohol sulfates, higher alcohol ethylene oxide addition sulfates, higher alcohol phosphates, and higher alcohol ethylene oxide addition phosphates.

The antistatic agents may include, e.g., nonionic antistatic agents such as higher alcohol ethylene oxides, polyethylene glycol fatty esters, and polyhydric alcohol fatty esters.

The electrolytes may include, e.g., salts (such as quaternary ammonium salts) of metals belonging to Group 1 of the periodic table (such as Li, Na and K). The salts of metals belonging to Group 1 of the periodic table may specifically include $LiCF_3SO_3$, $NaClO_4$, $LiAsF_6$, $LiBF_4$, NaSCN, KSCN and NaCl.

As the conducting agent for the conductive elastic layer, also usable are salts (such as $Ca(ClO_4)_2$) of metals belonging to Group 2 of the periodic table (such as Ca and Ba), and antistatic agents derived therefrom. Still also usable are ion-conductive conducting agents such as complexes of any of these with polyhydric alcohols or derivatives thereof, and complexes of any of these with monools. The polyhydric alcohols may include 1,4-butanediol, ethylene glycol, polyethylene glycol, propylene glycol and polyethylene glycol. The monools may include ethylene glycol monomethyl ether and ethylene glycol monoethyl ether.

As the conducting agent for the conductive elastic layer, also usable are conductive carbons such as KETJEN BLACK EC, acetylene black, rubber-purpose carbon, color(ink)-purpose carbon having been treated by oxidation, and thermally decomposed carbon. The rubber-purpose carbon may specifically include, e.g., Super Abrasion Furnace (SAF: super-resistance to abrasion), Intermediate Super Abrasion Furnace (ISAF: intermediate super-resistance to abrasion), High Abrasion Furnace (HAF: high resistance to abrasion), Fast Extruding Furnace (FEF: good extrudability), General Purpose Furnace (GPF: general-purpose properties), Semi Reinforcing Furnace (SRF: semi-reinforcing properties), Fine Thermal (FT: fine-particle thermally decomposed), and Medium Thermal (MT: medium-particle thermally decomposed).

As the conducting agent for the conductive elastic layer, the following may also be used: Graphites such as natural graphite and artificial graphite; metal oxides such as tin oxide, titanium oxide and zinc oxide; metals such as nickel, copper, silver and germanium; and conductive polymers such as polyaniline, polypyrrole and polyacetylene.

An inorganic or organic filler and a cross-linking agent may also be added to the conductive elastic layer. Such a filler may include, e.g., silica (white carbon), calcium carbonate, magnesium carbonate, clay, talc, zeolite, alumina, barium sulfate and aluminum sulfate. The cross-linking agent may include, e.g., sulfur, peroxides, cross-linking auxiliaries, cross-linking accelerators, cross-linking acceleration auxiliaries, and cross-linking retarders.

The conductive elastic layer may preferably have a hardness, as MD-1 hardness, of 60 degrees or more to 85 degrees or less, and particularly from 70 degrees or more to 80 degrees or less, from the viewpoint of keeping the charging member from deforming when the charging member and the charging object member electrophotographic photosensitive member are brought into contact with each other.

The charging member may also preferably be in what is called a crown shape in which it is larger in thickness at the middle of the conductive elastic layer than at its end portions.

Surface Layer:

The surface layer constituting the charging member according to the present invention contains a polymer having an Si—O—W linkage, and the polymer has a constitutional unit represented by the following formula (1) and a constitutional unit represented by the following formula (2).

Formula (1)

Formula (2)

In the formula (1), $R_1$ and $R_2$ each independently represent any of structures represented by the following formulas (3) to (6).

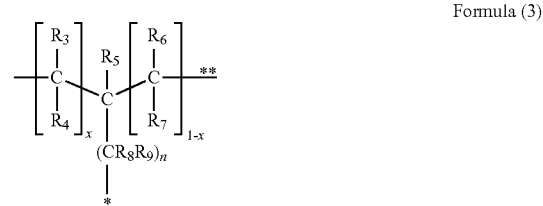

Formula (3)

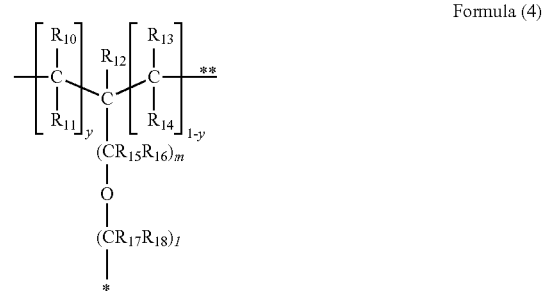

Formula (4)

-continued

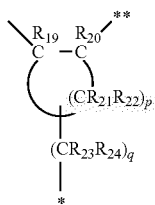

Formula (5)

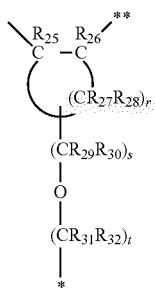

Formula (6)

In the formulas (3) to (6), $R_3$ to $R_7$, $R_{10}$ to $R_{14}$, $R_{19}$, $R_{20}$, $R_{25}$ and $R_{26}$ each independently represent a hydrogen atom, an alkyl group having 1 to 4 carbon atom(s), a hydroxyl group, a carboxyl group or an amino group; $R_8$, $R_9$, $R_{15}$ to $R_{18}$, $R_{23}$, $R_{24}$ and $R_{29}$ to $R_{32}$ each independently represent a hydrogen atom or an alkyl group having 1 to 4 carbon atom(s); $R_{21}$, $R_{22}$, $R_{27}$ and $R_{28}$ each independently represent a hydrogen atom, an alkoxyl group or alkyl group having 1 to 4 carbon atom(s); n, m, l, q, s and t each independently represent an integer of 1 to 8, p and r each independently represent an integer of 4 to 12, and x and y each independently represent 0 or 1; and an asterisk * and a double asterisk ** each represent the position of bonding with the silicon atom and oxygen atom, respectively, in the formula (1).

The polymer according to the present invention has a high crosslink density because it has the structure wherein siloxane linkages and organic-chain moieties bonded to the silicon atoms stand polymerized one another. Hence, where the surface layer composed of such a polymer is formed on the elastic layer of the charging member, any low-molecular weight component in the elastic layer can effectively be kept from exuding to the surface of the charging member. In addition, that the polymer has the Si—O—W linkage therein enables the charging member to have a low surface free energy and a low coefficient of friction.

The surface layer may preferably have a layer thickness of from 0.01 μm or more to 0.40 μm or less, and much preferably from 0.05 μm or more to 0.35 μm or less. As long as the surface layer has a layer thickness of 0.01 μm or more, such a layer is preferable from the viewpoint of making the charging member have a low surface free energy and a low coefficient of friction, and is much preferable as long as it has a layer thickness of 0.05 μm or more. As long as it has a layer thickness of 0.40 μm or less, such a layer is preferable from the viewpoint of coating performance for the surface layer, and is much preferable as long as it has a layer thickness of 0.35 μm or less.

As $R_1$ and $R_2$ in the formula (1) representing the unit in the polymer, these may preferably each independently be any structure selected from structures represented by the following formulas (7) to (10). Making them have such structures can make the surface layer tougher and superior in durability. In particular, structures each having an ether group as represented by the following formulas (8) and (10) can make the surface layer more improved in its adherence to the elastic layer.

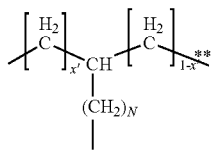

Formula (7)

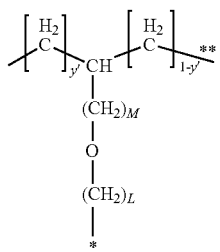

Formula (8)

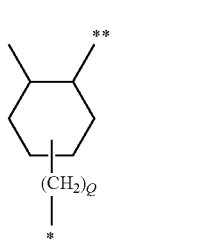

Formula (9)

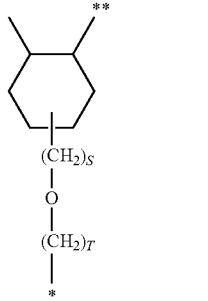

Formula (10)

In the formulas (7) to (10), N, M, L, Q, S and T each independently represent an integer of 1 or more to 8 or less, and x' and y' each independently represent 0 or 1. An asterisk * and a double asterisk ** each represent the position of bonding with the silicon atom and oxygen atom, respectively, in the formula (1).

As an example of the above polymer, part of structure formed when $R_1$ in the formula (1) is what is represented by the formula (3) and $R_2$ is what is represented by the formula (4) is shown below.

Formula (20)

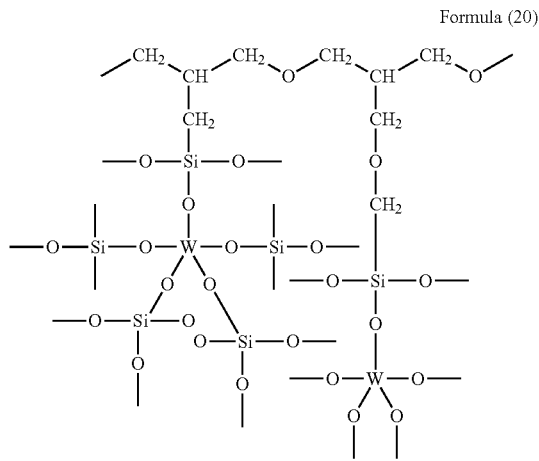

As another example of the above polymer, part of structure formed when $R_1$ in the formula (1) is what is represented by the formula (3) and $R_2$ is what is represented by the formula (5) is shown below.

Formula (21)

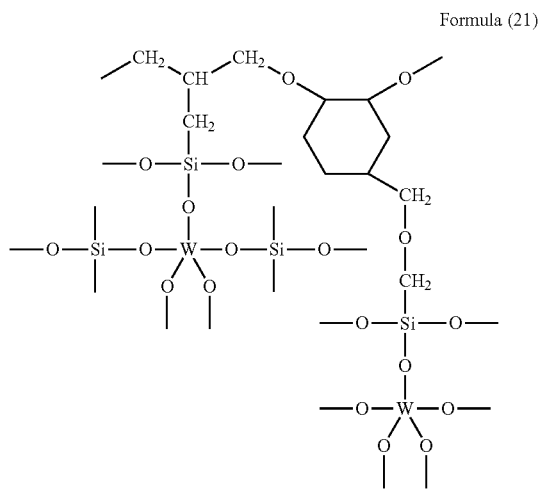

In the polymer, the ratio of the number of atoms of tungsten to that of silicon, W/Si, may preferably be from 0.1 or more to 12.5 or less, and much preferably be from 0.5 or more to 10.0 or less. This value is preferably 0.1 or more from the viewpoint of making the charging member have a low surface free energy and a low coefficient of friction, and much preferably 0.5 or more. It is preferably 12.5 or less from the viewpoint of stability of a surface layer coating solution and coating performance for the surface layer, and much preferably be 10.0 or less.

Making-Up of Surface Layer:

The polymer used in the present invention is obtained by subjecting a hydrolyzable silane compound having a structure represented by the following formula (11) and a hydrolyzable tungsten compound having a structure represented by the following formula (12), to hydrolysis and dehydration condensation to obtain a condensate, and thereafter cleaving epoxy groups the condensate has, to effect cross-linking.

Here, the degree of hydrolysis and condensation taking place at the trifunctional moiety of the formula (11) and the trifunctional moiety of the formula (12) may be controlled to control modulus of elasticity and denseness as film properties. Also, the organic-chain moiety of $R_{33}$ in the formula (11) may be used as a curing site. This enables control of the toughness of the surface layer and the adherence of the surface layer to the elastic layer. $R_{33}$ may also be set to be an organic group having an epoxy group capable of ring-opening by irradiation with ultraviolet rays. This can make curing time shorter than that for any conventional heat-curable materials, and can keep the surface layer from deteriorating thermally.

  Formula (11)

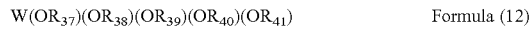  Formula (12)

In the formula (11), $R_{33}$ represents any structure selected from structures represented by the following formulas (13) to (16), each having an epoxy group; and $R_{34}$ to $R_{36}$ each independently represent a hydrocarbon group. In the formula (12), $R_{37}$ to $R_{41}$ each also independently represent a hydrocarbon group.

  Formula (13)

  Formula (14)

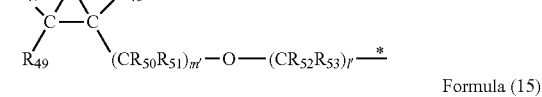  Formula (15)

  Formula (16)

In the formulas (13) to (16), $R_{42}$ to $R_{44}$, $R_{47}$ to $R_{49}$, $R_{54}$, $R_{55}$, $R_{60}$ and $R_{61}$ each independently represent a hydrogen atom, an alkyl group having 1 to 4 carbon atom(s), a hydroxyl group, a carboxyl group or an amino group; $R_{45}$, $R_{46}$, $R_{50}$ to $R_{52}$, $R_{58}$, $R_{59}$ and $R_{64}$ to $R_{67}$ each independently represent a hydrogen atom or an alkyl group having 1 to 4 carbon atom(s); $R_{56}$, $R_{57}$, $R_{62}$ and $R_{63}$ each independently represent a hydrogen atom, an alkoxyl group having 1 to 4 carbon atom(s) or an alkyl group having 1 to 4 carbon atom(s); n', m', l', q', s' and t' each independently represent an integer of 1 to 8, and p' and r' each independently represent an integer of 4 to 12; and an asterisk * represents the position of bonding with the silicon atom in the formula (11).

The polymer used in the present invention may preferably be a cross-linked product of the hydrolyzable silane compound represented by the formula (11) and the hydrolyzable tungsten compound represented by the formula (12) with a hydrolyzable silane compound represented by the following formula (17). In this case, the solubility of the formulas (11) and (12) compounds in the stage of synthesis, the coating performance of a surface layer coating solution and the physical properties of a film having been cured can improve the surface layer in its electrical properties, as being preferable. In particular, a case in which $R_{68}$ is an alkyl group is preferable as being improved in the solubility and coating performance. A case in which $R_{68}$ is a phenyl group is also preferable as being contributory to an improvement in the electrical properties, in particular, volume resistivity.

$$R_{68}—Si(OR_{69})(OR_{70})(OR_{71}) \qquad \text{Formula (17)}$$

In the formula (17), $R_{68}$ represents an alkyl group or an aryl group, and $R_{69}$ to $R_{71}$ each independently represent a hydrocarbon group.

The charging member according to the present invention may be produced by forming on the elastic layer a coating film of a coating material containing the above hydrolyzed condensate, and thereafter subjecting the hydrolyzed condensate contained in the coating film, to cross-linking to form the above polymer therein to make the resultant film serve as the surface layer.

Production Example of Polymer:

Here, as a production example of the polymer, how to prepare a surface layer coating solution (coating material) and how to form the polymer on the peripheral surface of the elastic layer to obtain the surface layer are specifically described. The polymer is produced through the following step (1) to step (6). In the following, a component (A) is the hydrolyzable silane compound represented by the formula (11), a component (B) is the hydrolyzable silane compound represented by the formula (17) and a component (C) is the hydrolyzable tungsten compound represented by the formula (12).

(1): The step of adjusting the molar ratio of components (A), (B) and (C), (C)/[(A)+(B)], to from 0.1 or more to 12.5 or less;
(2): the step of mixing the components (A) and (B), and then adding to the resultant mixture a component-(D) water and a component-(E) alcohol, followed by heating and reflux to effect hydrolysis condensation;
(3): the step of adding the component (C) to a solution obtained by effecting the hydrolysis condensation, to effect hydrolysis condensation;
(4): the step of adding a component-(F) photopolymerization initiator, and then diluting the resultant mixture with an alcohol to obtain a coating solution (coating material) containing a hydrolyzed condensate;
(5): the step of applying the coating solution onto the peripheral surface of the elastic layer formed on the substrate; and
(6): the step of subjecting the hydrolyzed condensate to cross-linking reaction to cure the coating solution.

Incidentally, the components (A), (B) and (C) may simultaneously be added in the step (2). Also, as to the hydrolyzable silane compounds, only one type may be used as the component (A), or two or more types of the component (A) and two or more types of the component (B) may be used in combination.

The hydrocarbon groups for $R_{34}$ to $R_{36}$ in the formula (11) may include, e.g., alkyl groups, alkenyl groups and aryl groups. Of these, straight-chain or branched-chain alkyl groups each having 1 to 4 carbon atom(s) are preferred, and further a methyl group, an ethyl group, a n-propyl group, an i-propyl group, a n-butyl group and a t-butyl group are much preferred.

Specific examples of the hydrolyzable silane compound having the structure represented by the formula (11) are shown below: 4-(1,2-Epoxybutyl)trimethoxysilane, 5,6-epoxyhexyltriethoxysilane, 8-oxysilan-2-yl octyltrimethoxysilane, 8-oxysilan-2-yl octyltriethoxysilane, 3-glycidoxypropyltrimethoxysilane, 3-glycidoxypropyltriethoxysilane, 1-(3,4-epoxycyclohexyl)ethyltrimethoxysilane, 1-(3,4-epoxycyclohexyl)ethyltriethoxysilane, 3-(3,4-epoxycyclohexyl)methyloxypropyltrimethoxysilane and 3-(3,4-epoxycyclohexyl)methyloxypropyltriethoxysilane.

As the alkyl group for $R_{68}$ in the formula (17), a straight-chain alkyl group having 1 to 21 carbon atom(s) is preferred, and one having 6 to 10 carbon atom is further preferred. As the $R_{68}$ aryl group, a phenyl group is preferred. The $R_{69}$ to $R_{71}$ each hydrocarbon group may include, e.g., alkyl groups, alkenyl groups and aryl groups. Of these, straight-chain or branched-chain alkyl groups having 1 to 4 carbon atom(s) are preferred, and further a methyl group, an ethyl group, a n-propyl group, an i-propyl group, a n-butyl group and a t-butyl group are much preferred.

Specific examples of the hydrolyzable silane compound having the structure represented by the formula (17) are shown below: Methyltrimethoxysilane, methyltriethoxysilane, methyltripropoxysilane, ethyltrimethoxysilane, ethyltriethoxysilane, ethyltripropoxysilane, propyltrimethoxysilane, propyltriethoxysilane, propyltripropoxysilane, hexyltrimethoxysilane, hexyltriethoxysilane, hexyltripropoxysilane, decyltrimethoxysilane, decyltriethoxysilane, decyltripropoxysilane, phenyltrimethoxysilane, phenyltriethoxysilane and phenyltripropoxysilane.

Where the hydrolyzable silane compounds having the structures represented by the formulas (11) and (17) are used in combination and $R_{68}$ in the formula (17) is a phenyl group, it may much preferably be used in combination with a hydrolyzable silane compound in which $R_{68}$ in the formula (17) is a straight-chain alkyl group having 6 to 10 carbon atoms. Its use in combination makes the compounds improved in compatibility with the solvent even when their structures change through the hydrolysis condensation reaction.

The hydrocarbon groups for $R_{37}$ to $R_{41}$ in the formula (12) may include, e.g., alkyl groups, alkenyl groups and aryl groups. Of these, straight-chain or branched-chain alkyl groups each having 1 to 4 carbon atom(s) are preferred, and further a methyl group, an ethyl group, a n-propyl group, an i-propyl group, a n-butyl group and a t-butyl group are much preferred.

Specific examples of the hydrolyzable tungsten compound having the structure represented by the formula (12) are shown below: Tungsten pentamethoxide, tungsten pentaethoxide, tungsten pentaisopropoxide, tungsten pentabutoxide, and tungsten pentaphenoxide.

The molar ratio of the above respective components, (C)/[(A)+(B)] (i.e., W/Si), may preferably be adjusted to from 0.1 or more to 12.5 or less, and much preferably from 0.5 or more to 10.0 or less. As long as it is 0.1 or more, the surface layer can have much lower surface free energy and coefficient of friction, and can be improved in the effect of preventing contaminants from adhering thereto. Inasmuch as it is 12.5 or less, the surface layer forming coating solution can have stable storage stability and coating performance.

As to the amount of the component-(D) water to be added, it may preferably be from 0.3 or more to 6.0 or less as the value of (D)/[(A)+(B)], based on the number of moles of the components (A) and (B). It may much preferably be from 1.2 or more to 1.8 or less. As long as it is 0.3 or more, the condensation may sufficiently proceed, and there can not easily remain any unreacted residual monomers, promising good film-forming properties. A system where any monomers do not remain is desirable also from the viewpoint of effective use of raw materials. Also, as long as it is 6.0 or less, the condensation may by no means proceed too rapidly, and the condensate can be prevented from becoming milky or precipitating. In addition, the condensate may by no means contain too much water and hence may by no means be of too high polarity, so that this promises a good compatibility when the condensate is mixed with water and an alcohol, and hence the condensate can be prevented from becoming milky or precipitating.

As the component-(E) alcohol, it is preferable to use a primary alcohol, a secondary alcohol, a tertiary alcohol, a mixed system of a primary alcohol and a secondary alcohol, or a mixed system of a primary alcohol and a tertiary alcohol. It is particularly preferable to use ethanol, a mixed solvent of methanol and 2-butanol, a mixed solvent of ethanol and 2-butanol, or a mixed solvent of 2-butanol and 1-butanol.

As the component-(F) photopolymerization initiator, it is preferable to use an onium salt of Lewis acid or Brφnsted acid. Other cationic polymerization initiator may include, e.g., borate salts, compounds having an imide structure, compounds having a triazine structure, azo compounds and peroxides. The photopolymerization initiator may preferably beforehand be diluted with a solvent such as an alcohol or a ketone so as to be improved in compatibility with the coating solution.

Among such various cationic polymerization initiators, an aromatic sulfonium salt or an aromatic iodonium salt is preferred from the viewpoint of sensitivity, stability and reactivity. In particular, a bis(4-tert-butylphenyl) iodonium salt, a compound having a structure represented by the following formula (18) (trade name: ADECAOPTOMER SP150; available from Asahi Denka Kogyo K.K.) and a compound having a structure represented by the following formula (19) (trade name: IRGACURE 261; available from Ciba Specialty Chemicals Inc.) are preferred.

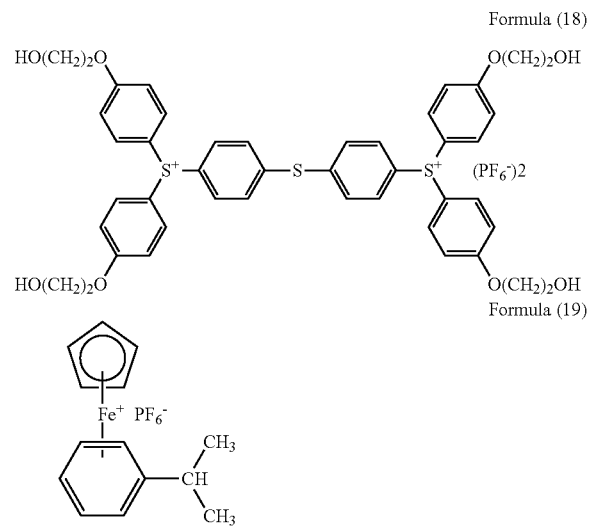

The coating solution synthesized as above is controlled to have a concentration suited for its actual coating. On this occasion, besides the hydrolyzed condensate, any suitable solvent may be used in order to improve coating performance. Such a suitable solvent may include, e.g., alcohols such as methanol, ethanol and 2-butanol, ethyl acetate, and ketones such as methyl ethyl ketone and methyl isobutyl ketone, or a mixture of any of these. In particular, ethanol or a mixed solvent of 2-butanol and 1-butanol is preferred.

Formation of Surface Layer:

The coating solution having been prepared in this way is coated on the peripheral surface of the elastic layer by a method such as coating making use of a roll coater, dip coating or ring coating, to form a coating layer. The coating layer is irradiated with activated-energy rays, whereupon cationic-polymerizable groups in the hydrolyzed condensate contained in the coating solution undergo cleavage and polymerization. This causes molecules of the hydrolyzed condensate to cross-link one another to come cured, thus the surface layer is formed. As the activated-energy rays, ultraviolet rays are preferred.

The curing of the surface layer with ultraviolet rays makes any excess heat not easily generated, and any phase separation that may come during volatilization of a solvent as in heat curing can not easily occur, thus a uniform film is obtained. This enables the photosensitive member to be provided with uniform and stable potential. Also, as long as the cross-linking reaction is carried out by ultraviolet radiation, the conductive elastic layer can be kept from its deterioration due to heat history, and hence the conductive elastic layer can also be kept from lowering in its electrical properties.

In the irradiation with ultraviolet rays, usable are a high-pressure mercury lamp, a metal halide lamp, a low-pressure mercury lamp, an excimer UV lamp and the like. Of these, an ultraviolet radiation source may be used which is rich in light of from 150 nm or more to 480 nm or less in wavelength of ultraviolet rays.

Here, integral light quantity of ultraviolet radiation is defined as shown below.

Ultraviolet radiation integral light quantity ($mJ/cm^2$)
=ultraviolet radiation intensity ($mW/cm^2$)×irradiation time (s).

The integral light quantity of ultraviolet radiation may be controlled by selecting irradiation time, lamp output, and distance between the lamp and the irradiation object. The integral light quantity may also be sloped within the irradiation time.

Where the low-pressure mercury lamp is used, the integral light quantity of ultraviolet radiation may be measured with an ultraviolet radiation integral light quantity meter UIT-150-A or UVD-S254 (both are trade names), manufactured by Ushio Inc. Where the excimer UV lamp is used, the integral light quantity of the ultraviolet radiation may also be measured with an ultraviolet radiation integral light quantity meter UIT-150-A or VUV-S172 (both are trade names), manufactured by Ushio Inc.

The charging member may preferably have a surface free energy of 35 $mJ/m^2$ or less, and much preferably 30 $mJ/m^2$ or less. As long as it has a surface free energy of $mJ/m^2$ or less, it can have no good affinity for any external additives used in toners and for discharge products, paper dust and so forth, and hence such deposits, even though present on the surface, can not easily stick thereto.

The charging member may preferably have a coefficient of friction of from 0.10 or more to 0.35 or less, and much preferably from 0.10 or more to 0.30 or less, as measured against a polyethylene terephthalate (PET) sheet. As long as it has a coefficient of friction of 0.10 or more, it can well follow up the movement of the photosensitive member (drum) to have no risk of slipping thereon, and can stably provide the photosensitive member (drum) with charges. Also, as long as it has a coefficient of friction of 0.30 or less, any external additives used in toners and any discharge products, paper dust and so forth may less adhere thereto.

Electrophotographic Apparatus & Process Cartridge:

The electrophotographic apparatus according to the present invention has an electrophotographic photosensitive member and a charging member disposed in contact with the electrophotographic photosensitive member, and is characterized in that the charging member is the charging member described above. Also, the process cartridge according to the present invention has an electrophotographic photosensitive member and a charging member disposed in contact with the electrophotographic photosensitive member, is so set up as to be detachably mountable to the main body of an electrophotographic apparatus, and is characterized in that the charging member is the charging member described above.

Figure 2:
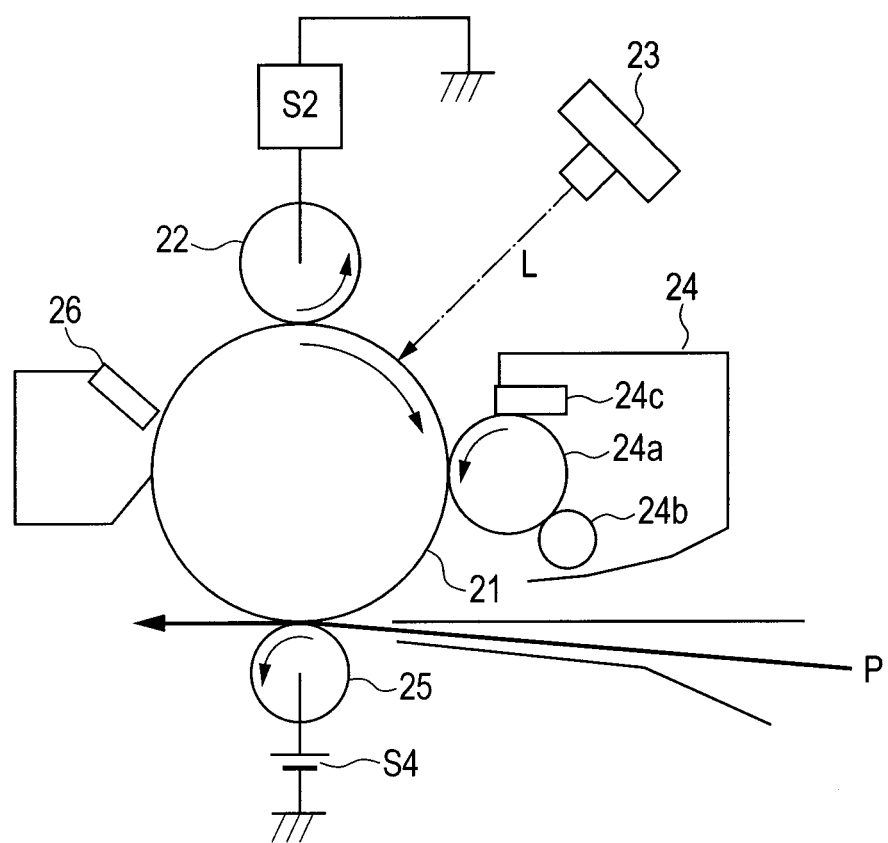
FIG. 2 is a schematic view of the construction of an electrophotographic apparatus having the charging member according to the present invention.

How the electrophotographic apparatus and process cartridge according to the present invention are set up is schematically described with reference to FIG. 2. Reference numeral 21 denotes a rotating drum-shaped electrophotographic photosensitive member (photosensitive member). This photosensitive member 21 is rotatingly driven clockwise as shown by an arrow in the drawing and at a stated peripheral speed (process speed). As the photosensitive member, any known photosensitive member may be employed which, e.g., has at least a roll-shaped conductive support and provided on the support a photosensitive layer containing an inorganic photosensitive material or organic photosensitive material. Also, the photosensitive member may further have a charge injection layer for charging the photosensitive member surface to stated polarity and potential.

A charging means is constituted of a charging roller and a charging bias applying power source S2, which applies a charging bias to the charging roller. The charging roller is kept in contact with the photosensitive member at a stated pressing force and, in this example, rotatingly driven in the direction that follows the rotation of the photosensitive member. To the charging roller, a stated DC voltage (−1,050 V in this example) is applied from the charging bias applying power source S2 (a DC charging system), whereby the surface of the photosensitive member is uniformly charge-processed to stated polarity and potential (to a dark-area potential of −500 V in this example).

As an exposure means 23, any known means may be used, which may preferably be exemplified by a laser beam scanner or the like. Letter symbol L denotes exposure light. By the exposure means, the charge-processed surface of the photosensitive member is put to imagewise exposure corresponding to the intended image information, whereupon the potential (light-area potential of −150 V in this example) at exposed light areas on the exposed surface of the photosensitive member lowers (attenuates) selectively, so that electrostatic latent images are formed on the photosensitive member.

As a reverse developing means, any known means may be used. For example, a developing means 24 in this example is so set up as to have a toner carrying member 24a which is provided at an opening of a developer container holding a toner therein and carries and transports the toner, an agitating member 24b which agitates the toner held in the container, and a toner coat control member 24c which controls toner carry level (toner layer thickness) on the toner carrying member 24a.

The developing means makes the toner (negatively chargeable toner) adhere selectively to the exposed light areas of the electrostatic latent images on the surface of the photosensitive member to render the electrostatic latent images visible as toner images; the toner standing charged (at a development bias of −400 V in this example) to the same polarity as that of charge polarity of the photosensitive member. As a developing system therefor, there are no particular limitations thereon, and any existing system may be used. As the existing system, a jumping developing system, a contact developing system, a magnetic-brush developing system or the like is available, for example. In particular, in an image forming apparatus which reproduces color toner images, the contact developing system is preferable for the purpose of, e.g., remedying the disposition of toner scattering.

As a transfer roller 25 serving as a transfer means, any known means may be used, which may be exemplified by a transfer roller comprising a support made of a metal or the like and covered thereon an elastic resin layer having been controlled to have a medium resistance. The transfer roller is kept in contact with the photosensitive member under a stated pressing force, and is rotated in the direction following the rotation of the photosensitive member at a peripheral speed substantially equal to the rotational peripheral speed of the photosensitive member. A transfer voltage having a polarity reverse to the charge characteristics of the toner is also applied from a transfer bias applying power source S4.

A transfer material P is fed at a stated timing through a paper feed mechanism (not shown) to the part of contact between the photosensitive member and the transfer roller, and the transfer material P is charged on its back, to a polarity reverse to the charge polarity of the toner by means of a transfer roller to which a transfer voltage is kept applied, whereby the toner images on the surface side of the photosensitive member are electrostatically transferred to the surface side of the transfer material P at the part of contact between the photosensitive member and the transfer roller.

The transfer material P to which the toner images have been transferred is separated from the surface of the photosensitive member, and is guided into a toner image fixing means (not shown), where the toner images are fixed. Then the image-fixed transfer material is put out as an image-formed matter. In the case of a double-side image-forming mode or a multiple-image-forming mode, this image-formed matter is guided into a recirculation delivery mechanism (not shown) and is again guided to the transfer zone.

Residue matter such as transfer residual toner on the surface of the photosensitive member is collected therefrom by a cleaning means 26 of a blade type or the like.

The electrophotographic apparatus of this example may be an apparatus having a process cartridge (not shown) in which the electrophotographic photosensitive member and the charging roller are integrally supported with a support member such as a resin molded product and which is so set up as to be detachably mountable to the main body of the electrophotographic apparatus as it is so integrally set up. It may further be a process cartridge in which, not only the electrophotographic photosensitive member and the charging roller, but also the developing means and the cleaning means are further integrally supported together.

EXAMPLES

The present invention is described below in greater detail by giving specific working examples. In the following working examples, "part(s)" refers to "part(s) by mass".

Example 1

(1) Formation & Evaluation of Conductive Elastic Layer

Materials shown in Table 1 were mixed by means of a 6-liter pressure kneader (equipment used: TD6-15MDX;

manufactured by Toshin Co., Ltd.) for 24 minutes in a packing of 70 vol. % and at a number of blade revolutions of 30 rpm to obtain an unvulcanized rubber composition. To 174 parts by mass of this unvulcanized rubber composition, 4.5 parts of tetrabenzylthiuram disulfide (trade name: SANCELER TBzTD; available from Sanshin Chemical Industry Co., Ltd.) as a vulcanization accelerator and 1.2 parts of sulfur as a vulcanizing agent were added. Then, these were mixed by means of an open roll of 12 inches in roll diameter at a number of front-roll revolutions of 8 rpm and a number of back-roll revolutions of 10 rpm and at a roll gap of 2 mm, carrying out right and left 20 cuts in total. Thereafter, the roll gap was changed to 0.5 mm to carry out tailing 10 times to obtain a kneaded product 1 for conductive elastic layer.

TABLE 1

| Raw materials | Amount |
|---|---|
| Medium/high-nitrile NBR (trade name: NIPOL DN219; bound acrylonitrile content center value: 33.5%; Mooney viscosity center value: 27; available from Nippon Zeon Co., Ltd.) | 100 parts |
| Carbon black for color (filler) (trade name: #7360SB; particle diameter: 28 nm; nitrogen adsorption specific surface area: 77 $m^2$/g; DBP oil absorption: 87 $cm^3$/100 g; available from Tokai Carbon Co., Ltd.) | 48 parts |
| Calcium carbonate (filler) (trade name: NANOX #30; available from Maruo Calcium Co., Ltd.) | 20 parts |
| Zinc oxide | 5 parts |
| Zinc stearate | 1 part |

Next, a substrate made of steel (one having been surface-plated with nickel; hereinafter "mandrel") in a columnar shape of 6 mm in diameter and 252 mm in length was readied. Then, this mandrel was coated with a metal- and rubber-containing heat-hardening adhesive (trade name: METALOC U-20, available from Toyokagaku Kenkyusho Co., Ltd.) over regions up to 115.5 mm from the both sides interposing the middle of the column surface in the axial direction (regions of 231 mm in total in width in the axial direction). The wet coating thus formed was dried at 80° C. for 30 minutes, and thereafter further dried at 120° C. for 1 hour.

The kneaded product 1 was extruded simultaneously with the above mandrel with adhesive layer while being shaped coaxially around the mandrel and in the shape of a cylinder of 8.75 mm to 8.90 mm in diameter, by extrusion making use of a cross head. The extruded product obtained was cut at its end portions to produce a conductive elastic roller the mandrel of which was covered on the outer periphery thereof with an unvulcanized conductive elastic layer. As an extruder, an extruder having a cylinder diameter of 70 mm and an L/D of 20 was used, making temperature control to 90° C. for its head, cylinder and screw at the time of extrusion.

Next, the above roller was vulcanized by using a continuous heating oven having two zones set at different temperatures. A first zone was set at a temperature of 80° C., where the roller was passed therethrough in 30 minutes, and a second zone was set at a temperature of 160° C. and the roller was passed therethrough also in 30 minutes, to obtain a vulcanized conductive elastic roller.

Next, this conductive elastic roller was cut at its both ends of the conductive elastic layer portion (rubber portion) to make the conductive elastic layer portion have a width of 232 mm in the axial direction. Thereafter, the surface of the conductive elastic layer portion was sanded with a rotary grinding wheel (number of work revolutions: 333 rpm; number of grinding wheel revolutions: 2,080 rpm; sanding time: 12 seconds). Thus, a conductive elastic roller 1 (conductive elastic roller having been surface-sanded) was obtained which had a crown shape of 8.26 mm in diameter at end portions and 8.50 mm in diameter at the middle portion, having a surface ten-point average roughness Rz of 5.5 μm and having a run-out of 18 μm.

The ten-point average roughness Rz was measured according to JIS B 6101. The run-out was measured with a high-precision laser measuring instrument LSM-430V, manufactured by Mitutoyo Corporation. Stated in detail, the outer diameter was measured with the measuring instrument, and the difference between a maximum outer diameter value and a minimum outer diameter value was regarded as outer-diameter difference run-out. This measurement was made at five spots, and an average value of outer-diameter difference run-out at five spots was regarded as the run-out of the measuring object.

(2) Synthesis & Evaluation of Condensate

Condensate No. 1

Next, a condensate No. 1 was synthesized through the following two-stage reaction.

Synthesis 1: First-Stage Reaction

Materials shown in Table 2 below were mixed, and thereafter stirred at room temperature for 30 minutes. Subsequently, heating and reflux were carried out at 120° C. for 20 hours by using an oil bath, to obtain a condensate intermediate No. 1 of the hydrolyzable silane compounds. The condensate intermediate No. 1 at this stage was 28.0% by mass as solid content (the mass ratio to solution total mass when the hydrolyzable compounds were assumed to have undergone dehydration condensation in their entirety).

TABLE 2

| Raw materials | Amount |
|---|---|
| Glycidoxypropyltrimethoxysilane (GPTMS, simply "EP-1") (hydrolyzable silane compound; trade name: KBM-403; available from Shin-Etsu Chemical Co., Ltd.) | 11.56 g (0.049 mol) |
| Hexyltrimethoxysilane (HeTMS, simply "He") (hydrolyzable silane compound; trade name: KBM-3063; available from Shin-Etsu Chemical Co., Ltd.) | 62.11 g (0.302 mol) |
| Ion-exchanged water | 11.34 g |
| Ethanol (guaranteed; available from Kishida Chemical Co., Ltd.) | 91.87 g |

Synthesis 2: Second-Stage Reaction

Next, to 108.41 g of the condensate intermediate No. 1, 68.39 g (0.215 mol) of tungsten pentaethoxide (W) (available from Gelest, Inc.) was added, and these were stirred at room temperature (25° C.) for 3 hours to obtain a liquid condensate No. 1. A sequence of stirring was carried out at a speed of 750 rpm. The number ratio of atoms W/Si was 1.0.

Evaluation (1): Stability of Condensate No. 1.

The stability of the condensate No. 1 was evaluated according to the following evaluation criteria.

A: The condensate stands neither milky nor precipitating even after its leaving for a month.

B: The condensate comes to stand a little milky after its leaving for about two weeks.

C: The condensate comes to stand a little milky after its leaving for about one week.

D: The condensate comes to stand milky or precipitating during its synthesis.

Evaluation (2): Confirmation of Structure of Formula (1) in Cured Film of Condensate No. 1.

It was confirmed by $^{29}$Si—NMR and $^{13}$C-NMR measurement whether or not the structure represented by the formula (1) was present in the cured product of the condensate No. 1 (instrument used: JMN-EX400, manufactured by JEOL Ltd.). How to prepare a sample for the measurement is described below.

First, an aromatic sulfonium salt (trade name: ADECAOPTOMER SP150; available from Asahi Denka Kogyo K.K.) as a cationic photopolymerization initiator was diluted with methanol to 10% by mass. Then, 0.7 g of the ethanol dilute solution of the cationic polymerization initiator was added to 25 g of the condensate No. 1. This is called a "mixture of condensate No. 1 and photopolymerization initiator".

To the "mixture of condensate No. 1 and photopolymerization initiator", a 1:1 (mass ratio) mixed solvent of ethanol and 2-butanol was added to regulate the former to have a theoretical solid content of 7.0% by mass, to obtain a "coating solution No. 1". Next, this "coating solution No. 1" was spin-coated on the surface of a sheet made of aluminum, having a thickness of 100 μm and having been surface-degreased. As a spin coating equipment, 1H-D7 (trade name; manufactured by Mikasa Co., Ltd.) was used. The spin coating was carried out under conditions of a number of revolutions of 300 rpm and a revolution time of 2 seconds.

Then, the wet coating of the "coating solution No. 1" was dried, and thereafter the coating film formed was irradiated with ultraviolet rays of 254 nm in wavelength to cure the coating film. The ultraviolet rays with which the coating film was irradiated were in an integral light quantity of 9,000 mJ/cm$^2$. In the irradiation with ultraviolet rays, a low-pressure mercury lamp (manufactured by Harison Toshiba Lighting Corporation) was used.

Next, the cured film formed was peeled from the sheet made of aluminum, and then pulverized by using a mortar made of agate, to prepare the sample for NMR measurement. This sample was measured for its $^{29}$Si—NMR spectrum and $^{13}$C-NMR spectrum by using a nuclear magnetic resonance instrument (trade name; JMN-EX400, manufactured by JEOL Ltd.).

Figure 3:
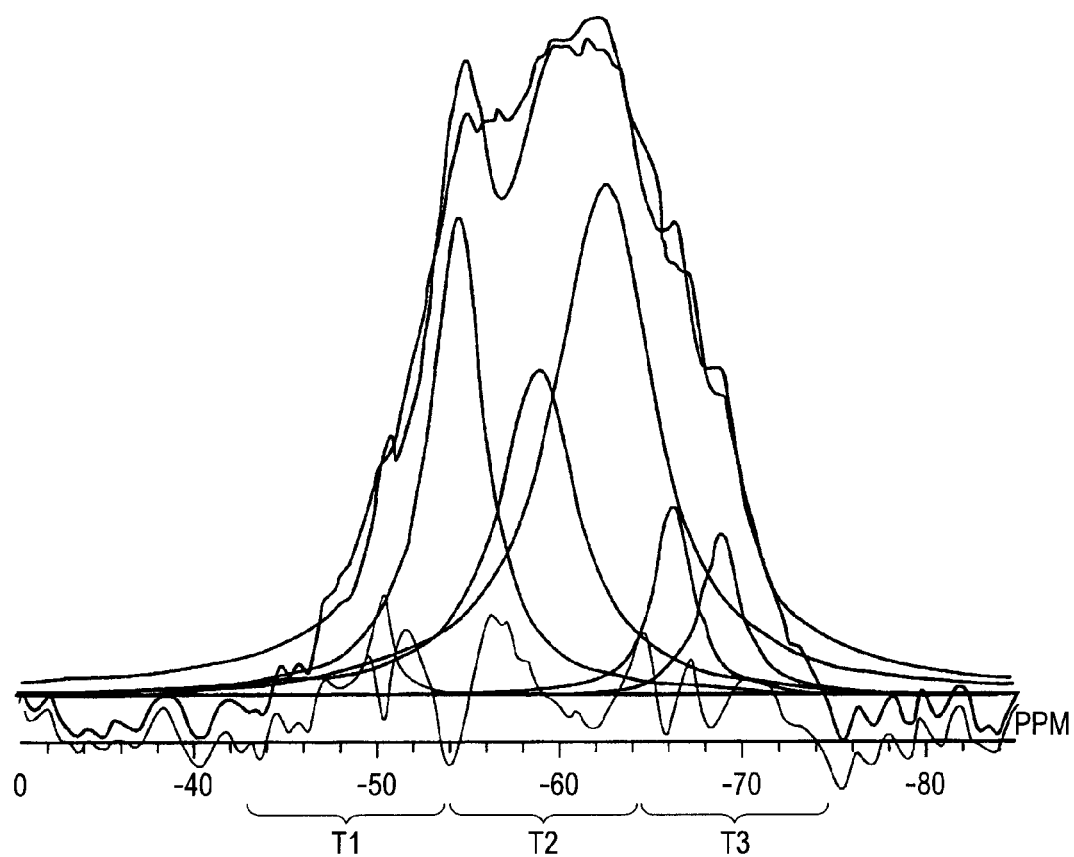
FIG. 3 is a chart showing the results of measurement by $^{29}Si$—NMR of a condensation product 1 for the surface layer of the present invention.

A $^{29}$Si—NMR spectrum is shown in FIG. 3. In the same figure, peaks formed by waveform separation of the spectrum are shown together. A peak in the vicinities of –64 ppm to –74 ppm shows a T3 component. Here, the T3 component shows a state in which the Si having one bond with an organic functional group has three bonds with the other atoms (Si and W) through the 0, i.e., —SiO$_{3/2}$. It was confirmed from FIG. 3 that there was a species present in the state of —SiO$_{3/2}$ upon condensation of a hydrolyzable silane compound having organic chains containing epoxy groups.

Figure 4:
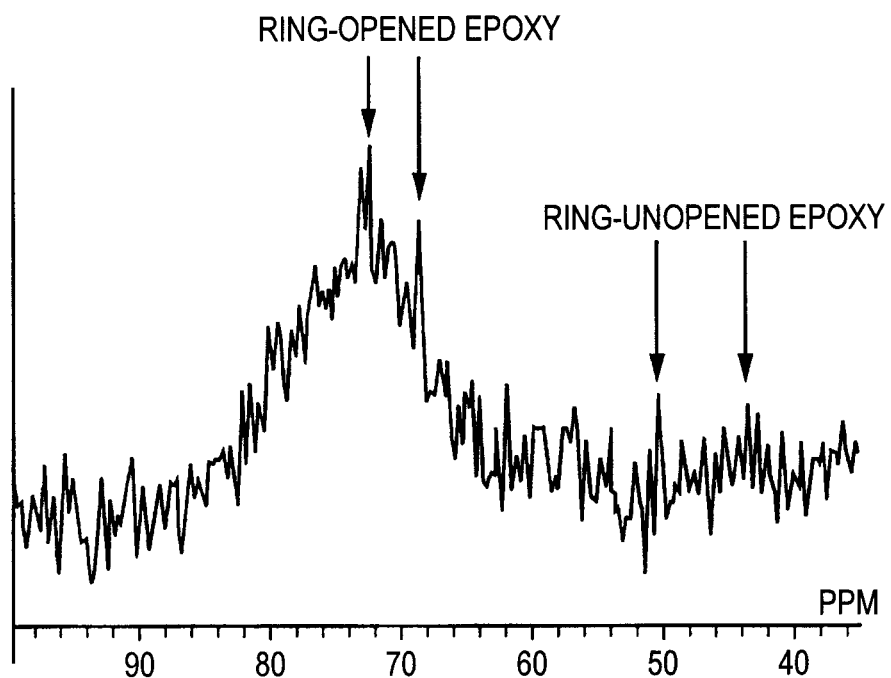
FIG. 4 is a chart showing the results of measurement by $^{13}C$-NMR of a condensate 1 for the surface layer of the present invention.

A $^{13}$C-NMR spectrum is also shown in FIG. 4. Peaks showing epoxy groups before ring-opening appear in the vicinities of 44 ppm and 51 ppm, and peaks after ring-opening polymerization appear in the vicinities of 69 ppm and 72 ppm. It was confirmed from FIG. 4 that the polymerization was effected almost without any ring-unopened epoxy groups remaining.

It was confirmed from the above $^{29}$Si—NMR and $^{13}$C-NMR measurement that the structure represented by the formula (1) was present in the cured product of the condensate No. 1.

(3) Production & Evaluation of Charging Rollers Nos. 1-1 to 1-7

Preparation of Surface Layer Forming Coating Materials Nos. 1-1 to 1-7

To the "mixture of condensate No. 1 and photopolymerization initiator", prepared in the same way as the above Evaluation (2), a 1:1 (mass ratio) mixed solvent of ethanol and 2-butanol was added to regulate the former to have a solid-matter concentration of 1.0% by mass, 0.1% by mass 0.2% by mass, 0.5% by mass, 3.5% by mass, 4.0% by mass and 5.0% by mass each, to obtain surface layer forming coating materials. These are designated as surface layer forming coating materials Nos. 1-1 to 1-7, respectively.

Formation of Surface Layer:

Next, about the conductive elastic roller 1 produced in the above (1) (the conductive elastic roller having been surface-sanded), seven rollers were readied and these conductive elastic rollers 1 were respectively coated, on their peripheral surfaces of the conductive elastic layers, with the surface layer forming coating materials Nos. 1-1 to 1-7 by ring coating (ejection rate: 0.120 mL/s; speed of ring head: 85 mm/s; total delivery: 0.130 mL). The coatings thus formed were each irradiated with ultraviolet rays of 254 nm in wavelength in such a way as to be in an integral light quantity of 9,000 mJ/cm$^2$) to cure the coatings (curing by cross-linking reaction) to form surface layers. In the irradiation with ultraviolet rays, a low-pressure mercury lamp (manufactured by Harison Toshiba Lighting Corporation) was used. Thus, charging rollers Nos. 1-1 to 1-7 were obtained. Then, the respective charging rollers obtained were put to the following evaluations (3) to (9)

Evaluation (3): Coating Performance.

How the external appearance of the surface of each charging roller stands was judged by visual observation and according to the following criteria.

A: Any faulty coating is not seen at all on the surface of the charging roller.
B: Faulty coating has appeared on some part of the surface of the charging roller.
C: Faulty coating has appeared on the whole area of the surface of the charging roller.

Evaluation (4): Measurement of Thickness of Surface Layer.

The layer thickness of the surface layer formed on each charging roller was measured. A section made by cutting the charging roller was observed to make measurement. Instrument used: Scanning transmission electron microscope (trade name: HD-2000; manufactured by Hitachi High-Technologies Corporation).

Evaluation (5): Identification of Si—O—W Linkage.

The presence of the Si—O—W linkage in the surface layer of each charging roller was identified by using ESCA (trade name; QUANTUM 2000, manufactured by Ulvac-Phi, Inc.). More specifically, the charging roller surface was so made as to be irradiated with X-rays to evaluate the manner of linkage in the surface layer. From an O1s spectrum detected, the presence of the Si—O—W linkage in the surface layer of each charging roller was identified.

Evaluation (6): Measurement of Surface Free Energy.

To calculate the surface free energy of the charging roller No. 1, its contact angles to three sorts of probe liquids on which three components of surface free energy are known, as shown in Table 3 below, were measured with a contact angle meter (trade name: CA-X ROLL Model, manufactured by Kyowa Interface Science Co., Ltd.).

Contact angles θ were measured under the following conditions.
Measurement: Droplet method (true-circle fitting).
Quantity of liquid: 1 μl.
Droplet impact recognition: Automatic.
Image processing: Algorithm-nonreflection.
Image mode: Frame.
Threshold level: Automatic.

In the following, L and S represent corresponding items of a liquid and a solid, respectively.

$\gamma^d$: Dispersion force term.
$\gamma^p$: Polar term.
$\gamma^h$: Hydrogen bond term.

TABLE 3

| Probe liquid | Kitazaki-Hata Theory | | | |
|---|---|---|---|---|
| | $\gamma L^d$ | $\gamma L^p$ | $\gamma L^h$ | $\gamma L^{Total}$ |
| Water | 29.1 | 1.3 | 42.4 | 72.8 |
| Diiodomethane | 46.8 | 4.0 | 0.0 | 50.8 |
| Ethylene glycol | 30.1 | 0.0 | 17.6 | 47.7 |

Unit: mJ/m² (20° C.)

In the above Table 3, $\gamma L^d$, $\gamma L^p$ and $\gamma L^h$ represent the dispersion force term, the polar term and the hydrogen bond term, respectively. The respective terms ($\gamma L^d$, $\gamma L^p$, $\gamma L^h$) of surface free energy of the three sorts of probe liquids in the above Table 3 and the contact angles θ to the respective probe liquids that were found by the measurement were substituted for those of the following calculation expression (1) to prepare three equations about the respective probe liquids, and their simultaneous cubic equations are solved to thereby calculate the values of $\gamma S^d$, $\gamma S^p$ and $\gamma S^h$. Then, the sum of the values of $\gamma S^d$, $\gamma S^p$ and $\gamma S^h$ was taken as the surface free energy ($\gamma^{Total}$). The charging member of the present invention may preferably have a total surface free energy ($\gamma^{Total}$) of from more than 25 mJ/m² to 35 mJ/m² or less.

$$\sqrt{\gamma_L^d \times \gamma_S^d} + \sqrt{\gamma_L^p \times \gamma_S^p} + \sqrt{\gamma_L^h \times \gamma_S^h} = \frac{\gamma_L(1+\cos\theta)}{2} \quad \text{Calculation expression (1)}$$

Evaluation (7): Measurement of Coefficient of Dynamic Friction.

Figure 5:
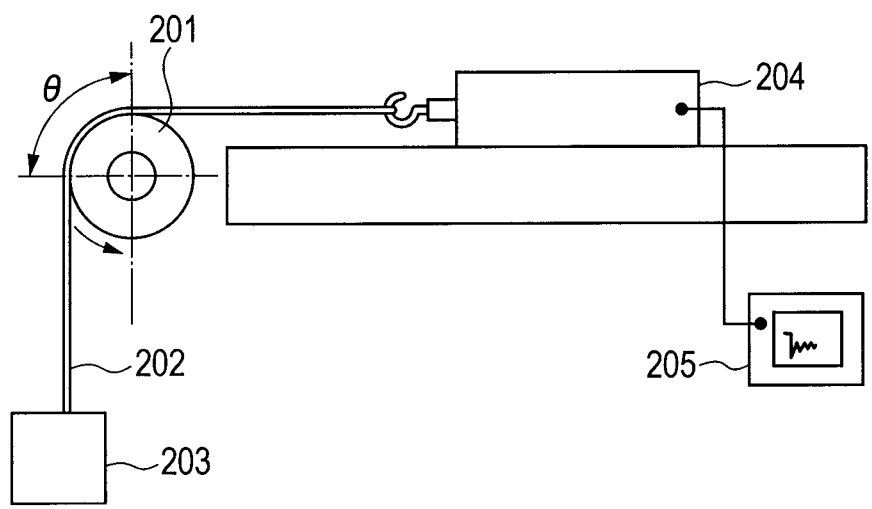
FIG. 5 is a schematic view of an instrument for measuring the coefficient of dynamic friction.

The coefficient of dynamic friction of the surface layer of the charging roller was measured with measuring equipment for coefficient of dynamic friction as shown in FIG. 5. In this measuring equipment for coefficient of dynamic friction, a charging roller 201 is brought into contact with a belt 202 [thickness: 100 µm: width: 30 mm; length: 180 mm; made of PET (trade name: LUMILAR S10, #100; available from Toray Industries, Inc.)] at a stated angle θ. The belt is also joined with a weight 203 at one end thereof and a load meter 204 at the other end. The load meter is also connected with a recorder 205.

When in the state as shown in FIG. 5 the charging member is rotated in a stated direction and at a stated speed, the force measured with the load meter is represented by F (g weight) and the sum of the mass of the weight 203 and the mass of the belt 202 is represented by W (g weight), where the coefficient of friction is found according to the following mathematical expression. Incidentally, this measuring method is based on the Euler's belt formula. In the present invention, the value of W was set to be W=100 (g weight), the rotational speed of the charging member was set to be 115 rpm, and the measurement was made in an environment of 23° C./50% RH. The results are shown in Table 9.

$$\text{Coefficient of friction} = (1/\theta)\ln(F/W). \quad \text{Mathematical expression (2)}$$

Evaluations (8) & (9): Evaluation of the Durability of Charging Roller.

The durabiity of each charging roller was evaluated in the following way. First, a laser beam printer (trade name: HP Laser Jet P1505 Printer; manufactured by Hewlett-Packard Co.) was readied as an electrophotographic apparatus. This laser beam printer delivers A4-size sheets lengthwise. Seven process cartridges for this laser beam printer were readied, and the charging rollers Nos. 1-1 to 1-7 were respectively set in the process cartridges. Using these process cartridges, the printer was operated in the following way.

That is, using the laser beam printer to which each process cartridge was mounted which was incorporated with the charging roller to be evaluated, electrophotographic images were reproduced on 1,000 sheets of A4-size paper in a low-temperature and low-humidity environment (temperature 15° C./humidity 10% RH). The electrophotographic images are images such that horizontal lines of 2 dots each in width and 118 spaces in interval are drawn on the A4-size paper in the direction perpendicular to the rotational direction of the electrophotographic photosensitive member.

After the electrophotographic images were reproduced on 1,000 sheets, the laser beam printer was left to stand still for 1 hour, and thereafter a solid black image was formed on one sheet. Here, the above electrophotographic images were formed in what is called an intermittent mode, in which the rotation of the electrophotographic photosensitive member was stopped over a period of 10 seconds at intervals of reproduction on one sheet. The image reproduction in an intermittent mode comes to a larger number of times of friction between the charging roller and the electrophotographic photosensitive member than a case in which electrophotographic images are continuously formed, and hence this can be said to be severer evaluation conditions for the charging roller.

Evaluation (8)

The solid black image thus obtained was visually observed to make evaluation according to the criteria shown in Table 4 below. Incidentally, the following evaluation criteria are based on that the shape of the charging roller is a shape tending to cause horizontal streaks on both end portions of the solid black image when the toner and so forth have adhered to the charging roller with its service.

TABLE 4

A   Any horizontal streaks caused by stains of the surface of the charging roller are not seen.
B   Horizontal streaks caused by stains of the surface of the charging roller are Slightly seen on the solid black image at its areas within 3 cm each from the both ends.
C   Horizontal streaks caused by stains of the surface of the charging roller are slightly seen on the solid black image at its areas of more than 3 cm to 5 cm or less each from the both ends.
D   Horizontal streaks caused by stains of the surface of the charging roller are clearly seen on the solid black image at its areas of more than 3 cm to 5 cm or less each from the both ends.

Evaluation (9)

From the laser beam printer having finished the formation of electrophotographic images on 1,001 sheets as described above, the process cartridge was detached, and the charging roller No. 1-1 was taken off this process cartridge, where how much the surface of the charging roller No. 1-1 stood stained was visually observed to make evaluation according to the criteria shown in Table 5 below. Incidentally, with regard to the one in which the coating performance was ranked "C" in the evaluation results in Evaluation (3), it was difficult to visually make a distinction between stains and faulty coating, and hence the matter was ranked "C" also in this evaluation.

TABLE 5

| | |
|---|---|
| A | Any stains can not be seen. |
| B | Slight stains can be seen only on roller end portions. |
| C | Stains can be seen only on roller end portions. |
| D | Stains can be seen over the whole roller. |

Examples 2 to 15

(1) Preparation & Evaluation of Condensates Nos. 2 to 15

Condensate intermediates Nos. 2 to 9 were prepared in the same way as the condensate intermediate No. 1 in Example 1 except that they were composed as shown in Table 6 below.

Next, condensates Nos. 2 to 15 were prepared in the same way as the condensate No. 1 in Example 1 except that they were composed as shown in Table 7 below. About the condensates obtained, Evaluation (1) and Evaluation (2) as described in Example 1 were made.

Here, abbreviation symbols EP-1 to EP-5, He and Ph in the columns of the components (A) and (B) in Table 6 and also an abbreviation symbol W-1 in the column of the component (C) in Table 7 represent the compounds shown in Table 8.

TABLE 6

Condensate intermediate

Synthesis 1

| | Component (A) | | | | | Component (B) | | | |
|---|---|---|---|---|---|---|---|---|---|
| No. | EP-1 (g) | EP-2 (g) | EP-3 (g) | EP-4 (g) | EP-5 (g) | He (g) | Ph (g) | $H_2O$ (g) | EtOH (g) |
| 1 | 11.56 | — | — | — | — | 62.11 | — | 11.34 | 91.87 |
| 2 | 69.97 | — | — | — | — | — | — | 9.61 | 97.26 |
| 3 | 38.35 | — | — | — | — | 33.53 | — | 10.53 | 94.22 |
| 4 | 11.75 | — | — | — | — | 41.08 | 25.64 | 11.52 | 86.64 |
| 5 | — | 9.82 | — | — | — | 64.86 | — | 11.84 | 90.15 |
| 6 | — | — | 13.01 | — | — | 59.72 | — | 10.90 | 93.18 |
| 7 | — | — | — | 11.93 | — | 61.40 | — | 11.21 | 92.11 |
| 8 | — | — | — | — | 13.63 | 62.11 | — | 11.34 | 103.45 |
| 9 | 5.75 | — | — | 6.00 | — | 61.76 | — | 11.28 | 91.99 |

TABLE 7

| Condensate No. | Condensate intermediate No. | Component (C) Amount (g) | W-1 (g) | W/Si |
|---|---|---|---|---|
| 1 | 1 | 108.41 | 63.39 | 1.00 |
| 2 | 1 | 19.90 | 156.9 | 12.50 |
| 3 | 1 | 166.31 | 10.49 | 0.10 |
| 4 | 1 | 24.19 | 152.61 | 10.00 |
| 5 | 1 | 134.40 | 42.4 | 0.50 |
| 6 | 1 | 19.21 | 157.59 | 13.00 |
| 7 | 1 | 171.39 | 5.41 | 0.05 |
| 8 | 2 | 115.21 | 61.59 | 1.00 |
| 9 | 3 | 111.43 | 65.37 | 1.00 |
| 10 | 4 | 107.69 | 69.11 | 1.00 |
| 11 | 5 | 106.53 | 70.27 | 1.00 |
| 12 | 6 | 110.03 | 66.77 | 1.00 |
| 13 | 7 | 108.84 | 67.96 | 1.00 |
| 14 | 8 | 111.50 | 65.3 | 1.00 |
| 15 | 9 | 111.64 | 65.16 | 1.00 |

TABLE 8

| Abbr. symbol | Compound name | Maker | Trade name |
|---|---|---|---|
| EP-1 | 3-glycidoxypropyltrimethoxysilane | Shin-Etsu Chemical Co. | KBM-403 |
| EP-2 | 4-(1,2-epoxybutyl) trimethoxysilane | Carbone Scientific Co. | |
| EP-3 | 8-oxysilan-2-yl octyltrimethoxysilane | SiKEMIA Co. | |
| EP-4 | 1-(3,4-epoxycyclohexyl) ethyltrimethoxysilane | Shin-Etsu Chemical Co. | KBM-303 |
| EP-5 | 3-glycidoxypropyltriethoxysilane | Shin-Etsu Chemical Co. | KBE-403 |
| He | Hexyltrimethoxysilane | Shin-Etsu Chemical Co. | KBM-3063 |
| Ph | Phenyltrimethoxysilane | Shin-Etsu Chemical Co. | MBE-103 |
| W-1 | Tungsten pentaethoxide | Gelest, Inc. | |

(2) Production & Evaluation of Charging Rollers

Production of Charging Rollers Nos. 2 & 3

Surface layer forming coating materials 2-1 to 2-5 were prepared in the same way as Example 1 except that the condensate No. 2 was used. The respective coating materials were controlled to have solid-matter concentrations of 0.1% by mass 0.2% by mass, 1.0% by mass, 4.0% by mass and 5.0% by mass, respectively. Surface layer forming coating materials 3-1 to 3-5 were likewise prepared by using the condensate No. 3.

Charging rollers Nos. 2-1 to 2-5 and Nos. 3-1 to 3-5 were produced in the same way as Example 1 except that the above coating materials were used, respectively. These rollers were put to Evaluations (3) to (9). Production of Charging Rollers Nos. 4 to 7

Surface layer forming coating materials 4-1 to 4-3 were prepared in the same way as Example 1 except that the condensate No. 4 was used. The respective coating materials were controlled to have solid-matter concentrations of 0.5% by mass 1.0% by mass and 3.5% by mass, respectively. Surface layer forming coating materials 5-1 to 5-3, surface layer forming coating materials 6-1 to 6-3 and surface layer forming coating materials 7-1 to 7-3 were likewise prepared by using the condensates Nos. 5 to 7, respectively.

Charging rollers Nos. 4-1 to 4-3, charging rollers Nos. 5-1 to 5-3, charging rollers Nos. 6-1 to 6-3 and charging rollers Nos. 7-1 to 7-3 were produced in the same way as Example 1 except that the above coating materials were used, respectively. These rollers were put to Evaluations (3) to (9).

Production of Charging Rollers Nos. 8 to 15

Surface layer forming coating materials 8 to 15 were prepared in the same way as Example 1 except that the condensates Nos. 8 to 15 were used, respectively. These were each controlled to have a solid-matter concentration of 1.0% by mass.

Charging rollers Nos. 8 to 15 were produced in the same way as Example 1 except that the above coating materials were used, respectively. These rollers were put to Evaluations (3) to (9).

The results of Evaluations (3) to (9) on the above charging rollers according to these Examples are shown in Table 9.

TABLE 9

| Condensate No. | Charging roller No. | (3) | (4) (μm) | (5) Presence of Si—O—W linkage | (6) $\gamma^{Total}$ (mJ/m²) | (7) | (8) | (9) |
|---|---|---|---|---|---|---|---|---|
| Example: | | | | | | | | |
| 1 | 1 | 1-1 | A | 0.100 | Yes. | 29.0 | 0.27 | A | A |
|  |  | 1-2 | A | 0.005 | Yes. | 36.0 | 0.36 | C | C |
|  |  | 1-3 | A | 0.010 | Yes. | 33.9 | 0.34 | B | C |
|  |  | 1-4 | A | 0.050 | Yes. | 30.4 | 0.29 | A | B |
|  |  | 1-5 | A | 0.350 | Yes. | 26.2 | 0.25 | A | A |
|  |  | 1-6 | A | 0.400 | Yes. | 25.3 | 0.24 | A | A |
|  |  | 1-7 | B | 0.450 | Yes. | 24.1 | 0.23 | A | A |
| 2 | 2 | 2-1 | A | 0.005 | Yes. | 32.7 | 0.33 | B | C |
|  |  | 2-2 | A | 0.010 | Yes. | 31.8 | 0.30 | B | B |
|  |  | 2-3 | A | 0.100 | Yes. | 27.6 | 0.25 | A | A |
|  |  | 2-4 | A | 0.400 | Yes. | 24.3 | 0.23 | A | C |
|  |  | 2-5 | B | 0.450 | Yes. | 22.9 | 0.22 | A | C |
| 3 | 3 | 3-1 | A | 0.005 | Yes. | 36.2 | 0.36 | C | C |
|  |  | 3-2 | A | 0.010 | Yes. | 34.1 | 0.34 | B | C |
|  |  | 3-3 | A | 0.100 | Yes. | 32.0 | 0.30 | B | B |
|  |  | 3-4 | A | 0.400 | Yes. | 31.1 | 0.30 | B | B |
|  |  | 3-5 | B | 0.450 | Yes. | 29.9 | 0.29 | A | C |
| 4 | 4 | 4-1 | A | 0.050 | Yes. | 29.2 | 0.28 | A | B |
|  |  | 4-2 | A | 0.100 | Yes. | 28.2 | 0.26 | A | A |
|  |  | 4-3 | A | 0.350 | Yes. | 25.4 | 0.24 | A | A |
| 5 | 5 | 5-1 | A | 0.050 | Yes. | 30.8 | 0.30 | A | B |
|  |  | 5-2 | A | 0.100 | Yes. | 30.3 | 0.29 | A | B |
|  |  | 5-3 | A | 0.350 | Yes. | 27.8 | 0.26 | A | A |
| 6 | 6 | 6-1 | A | 0.010 | Yes. | 31.9 | 0.30 | B | B |
|  |  | 6-2 | A | 0.100 | Yes. | 26.9 | 0.25 | A | A |
|  |  | 6-3 | B | 0.400 | Yes. | 23.5 | 0.23 | A | C |
| 7 | 7 | 7-1 | A | 0.010 | Yes. | 36.5 | 0.36 | C | C |
|  |  | 7-2 | A | 0.100 | Yes. | 35.6 | 0.36 | C | C |
|  |  | 7-3 | A | 0.400 | Yes. | 34.8 | 0.35 | C | C |
| 8 | 8 | 8 | A | 0.100 | Yes. | 29.9 | 0.28 | A | A |
| 9 | 9 | 9 | A | 0.100 | Yes. | 29.8 | 0.28 | A | A |
| 10 | 10 | 10 | A | 0.100 | Yes. | 29.3 | 0.27 | A | A |
| 11 | 11 | 11 | A | 0.100 | Yes. | 28.3 | 0.26 | A | A |
| 12 | 12 | 12 | A | 0.100 | Yes. | 29.1 | 0.27 | A | A |
| 13 | 13 | 13 | A | 0.100 | Yes. | 29.0 | 0.27 | A | A |
| 14 | 14 | 14 | A | 0.100 | Yes. | 28.7 | 0.27 | A | A |
| 15 | 15 | 15 | A | 0.100 | Yes. | 28.9 | 0.27 | A | A |

Comparative Example 1

Preparation & Evaluation of Condensate No. 16 for Comparison

The condensate intermediate No. 2 was put to Evaluation (1) as a condensate No. 16 for comparison. Incidentally, Evaluation (2) was not made because this condensate No. 16 did not make use of any hydrolyzable tungsten compound in the raw materials.

Production & Evaluation of Charging Roller No. 16

A surface layer forming coating material 16 was prepared in the same way as the surface layer forming coating material 1-1 in Example 1 except that the condensate No. 16 was used. A charging roller No. 16 was produced in the same way as the charging roller No. 1-1 in Example 1 except that this coating material was used. This roller was put to Evaluations (3), (4) and (6) to (9). Evaluation (5) was not made because any hydrolyzable tungsten compound was not used in the raw materials of the condensate.

Comparative Example 2

Preparation & Evaluation of Condensate No. 17

A condensate No. 17 for comparison was prepared by hydrolyzing only the component (C) without use of the components (A) and (B) as shown in Table 10 below, and was put to Evaluation (1).

TABLE 10

| Condensate No. | Component (C) W-1 (g) | $H_2O$ (g) | EtOH (g) |
|---|---|---|---|
| 17 | 75.88 | 2.14 | 98.64 |

Production & Evaluation of Charging Roller No. 17

A surface layer forming coating material 17 was prepared in the same way as the surface layer forming coating material 1-1 in Example 1 except that the above condensate No. 17 was used and that any cationic photopolymerization initiator was added. A charging roller No. 17 was produced in the same way as the charging roller No. 1-1 according to Example 1 except that this coating material was used.

Here, the coating film of the surface layer forming coating material 17, formed on the conductive elastic roller, was cured by heating it at a temperature of 250° C. for 1 hour. The charging roller 17 thus obtained was put to Evaluations (3). Evaluations (4), (6), (7), (8) and (9) were not made because the coating performance of the surface layer forming coating material 17 was so poor as to make it difficult to form the film. Evaluation (5) was also not made because any hydrolyzable tungsten compound was not used in the raw materials of the condensate.

The results of evaluation on Comparative Examples 1 and 2 are shown in Table 11.

TABLE 11

| | (1) | (3) | (4) (μm) | (6) $\gamma^{Total}$ (mJ/m²) | (7) | (8) | (9) |
|---|---|---|---|---|---|---|---|
| Comparative Example: | | | | | | | |
| 1 | A | A | 0.100 | 39.9 | 0.39 | D | D |
| 2 | D | C | — | — | — | — | — |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2011-029779, filed on Feb. 15, 2011, which is herein incorporated by reference as part of this application.

REFERENCE SIGNS LIST 101 substrate
102 conductive elastic layer
103 surface layer
21 electrophotographic photosensitive member 22 charging member (charging roller)
23 exposure means
24 developing means
24a toner carrying member
24b agitating member
24c toner coat control member
25 transfer roller
26 cleaning means
L exposure light
S2, S4 bias applying power source
P transfer material
201 charging roller
202 belt
203 weight
204 load meter
205 recorder

What is claimed is:

1. A charging member which comprises a substrate, an elastic layer and a surface layer; wherein the surface layer contains a polymer having an Si—O—W linkage; and the polymer has a constitutional unit represented by the following formula (1) and a constitutional unit represented by the following formula (2):

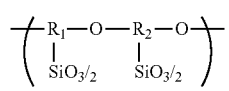

Formula (1)

$WO_{5/2}$

Formula (2)

where, in the formula (1), $R_1$ and $R_2$ each independently represent any of structures represented by the following formulas (3) to (6):

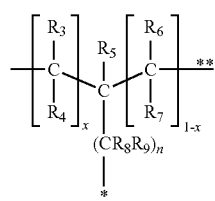

Formula (3)

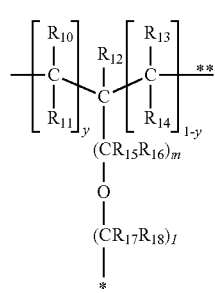

Formula (4)

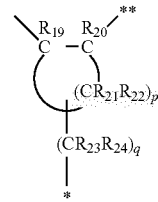

Formula (5)

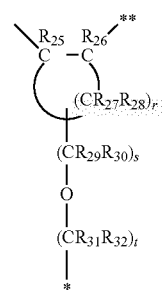

Formula (6)

where, in the formulas (3) to (6), $R_3$ to $R_7$, $R_{10}$ to $R_{14}$, $R_{19}$, $R_{20}$, $R_{25}$ and $R_{26}$ each independently represent a hydrogen atom, an alkyl group having 1 to 4 carbon atom(s), a hydroxyl group, a carboxyl group or an amino group; $R_8$, $R_9$, $R_{15}$ to $R_{18}$, $R_{23}$, $R_{24}$ and $R_{29}$ to $R_{22}$ each independently represent a hydrogen atom or an alkyl group having 1 to 4 carbon atom(s); $R_{21}$, $R_{22}$, $R_{27}$ and $R_{28}$ each independently represent a hydrogen atom, an alkoxyl group or alkyl group having 1 to 4 carbon atom(s); n, m, l, q, s and t each independently represent an integer of 1 to 8, p and r each independently represent an integer of 4 to 12, and x and y each independently represent 0 or 1; and an asterisk * and a double asterisk ** each represent the position of bonding with the silicon atom and oxygen atom, respectively, in the formula (1).

2. The charging member according to claim 1, wherein $R_1$ and $R_2$ in the formula (1) are each independently any of structures represented by the following formulas (7) to (10):

Formula (7)

Formula (8)

Formula (9)

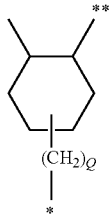

Formula (10)

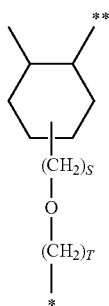

Formula (15)

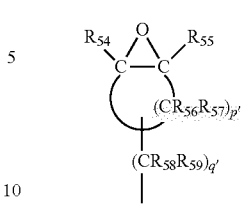

Formula (16)

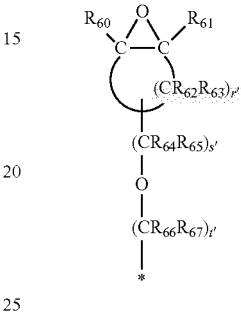

where, in the formulas (7) to (10), N, M, L, Q, S and T each independently represent an integer of 1 or more to 8 or less; x' and y' each independently represent 0 or 1; and an asterisk * and a double asterisk ** each represent the position of bonding with the silicon atom and oxygen atom, respectively, in the formula (1).

3. The charging member according to claim 1, wherein the ratio of the number of atoms of tungsten to that of silicon, W/Si, is from 0.1 or more to 12.5 or less.

4. The charging member according to claim 1, wherein the polymer is a cross-linked product of a hydrolyzed condensate of hydrolyzable silane compounds represented by the following formulas (11) and (12):

  Formula (11)

  Formula (12)

where, in the formula (11), $R_{33}$ represents any of structures represented by the following formulas (13) to (16), each having an epoxy group; and $R_{34}$ to $R_{36}$ each independently represent a hydrocarbon group; and, in the formula (12), $R_{37}$ to $R_{41}$ each also independently represent a hydrocarbon group:

Formula (13)

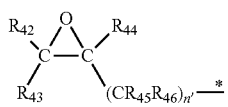

Formula (14)

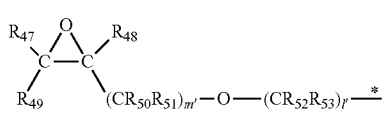

where, in the formulas (13) to (16), $R_{42}$ to $R_{44}$, $R_{47}$ to $R_{49}$, $R_{54}$, $R_{55}$, $R_{60}$ and $R_{61}$ each independently represent a hydrogen atom, an alkyl group having 1 to 4 carbon atom(s), a hydroxyl group, a carboxyl group or an amino group; $R_{45}$, $R_{46}$, $R_{50}$ to $R_{53}$, $R_{58}$, $R_{59}$ and $R_{64}$ to $R_{67}$ each independently represent a hydrogen atom or an alkyl group having 1 to 4 carbon atom(s); $R_{56}$, $R_{57}$, $R_{62}$ and $R_{63}$ each independently represent a hydrogen atom, an alkoxyl group having 1 to 4 carbon atom(s) or an alkyl group having 1 to 4 carbon atom(s); n', m', l', q', s' and t' each independently represent an integer of 1 to 8, and p' and r' each independently represent an integer of 4 to 12; and an asterisk * represents the position of bonding with the silicon atom in the formula (11).

5. A process for producing the charging member according to claim 4, comprising the steps of:

forming on the peripheral surface of the elastic layer a coating film of a coating material containing a hydrolyzed condensate synthesized from the hydrolyzable compounds represented by the formulas (11) and (12); and cleaving epoxy groups of the hydrolyzed condensate to effect cross-linking of the hydrolyzed condensate to form the surface layer.

6. The charging member according to claim 1, wherein the polymer is a cross-linked product of a hydrolyzed condensate of the hydrolyzable silane compound represented by the following formulas (11), (12) and (17):

  Formula (11)

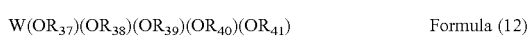  Formula (12)

where, in the formula (11), $R_{33}$ represents any of structures represented by the following formulas (13) to (16), each having an epoxy group; and $R_{34}$ to $R_{36}$ each independently represent a hydrocarbon group; and, in the formula (12), $R_{37}$ to $R_{41}$ each also independently represent a hydrocarbon group:

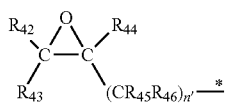

Formula (13)

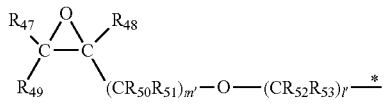

Formula (14)

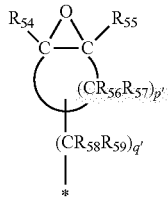

Formula (15)

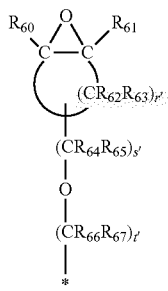

Formula (16)

where, in the formulas (13) to (16), $R_{42}$ to $R_{44}$, $R_{47}$ to $R_{49}$, $R_{54}$, $R_{55}$, $R_{60}$ and $R_{61}$ each independently represent a hydrogen atom, an alkyl group having 1 to 4 carbon atom(s), a hydroxyl group, a carboxyl group or an amino group; $R_{45}$, $R_{46}$, $R_{50}$ to $R_{53}$, $R_{58}$, $R_{59}$ and $R_{64}$ to $R_{67}$ each independently represent a hydrogen atom or an alkyl group having 1 to 4 carbon atom(s); $R_{56}$, $R_{57}$, $R_{62}$ and $R_{63}$ each independently represent a hydrogen atom, an alkoxyl group having 1 to 4 carbon atom(s) or an alkyl group having 1 to 4 carbon atom(s); n', m', l', q', s' and t' each independently represent an integer of 1 to 8, and p' and r' each independently represent an integer of 4 to 12; and an asterisk * represents the position of bonding with the silicon atom in the formula (11):

$$R_{68}-Si(OR_{69})(OR_{70})(OR_{71})$$ Formula (17)

where, in the formula (17), $R_{68}$ represents an alkyl group or an aryl group, and $R_{69}$ to $R_{71}$ each independently represent a hydrocarbon group.

7. A process for producing the charging member according to claim 6, comprising the steps of:
   forming on the peripheral surface of the elastic layer a coating film of a coating material containing a hydrolyzed condensate synthesized from the hydrolyzable compounds represented by the formulas (11), (12) and (17); and
   cleaving epoxy groups of the hydrolyzed condensate to effect cross-linking of the hydrolyzed condensate to form the surface layer.

8. An electrophotographic apparatus which comprises an electrophotographic photosensitive member and the charging member according to claim 1, disposed in contact with the electrophotographic photosensitive member.

9. A process cartridge which comprises an electrophotographic photosensitive member and the charging member according to claim 1, disposed in contact with the electrophotographic photosensitive member, and which is so set up as to be detachably mountable to the main body of an electrophotographic apparatus.

* * * * *